(No Model.)
W. H. SMITH.
WAGON RUNNING GEAR.
No. 507,563. Patented Oct. 31, 1893.
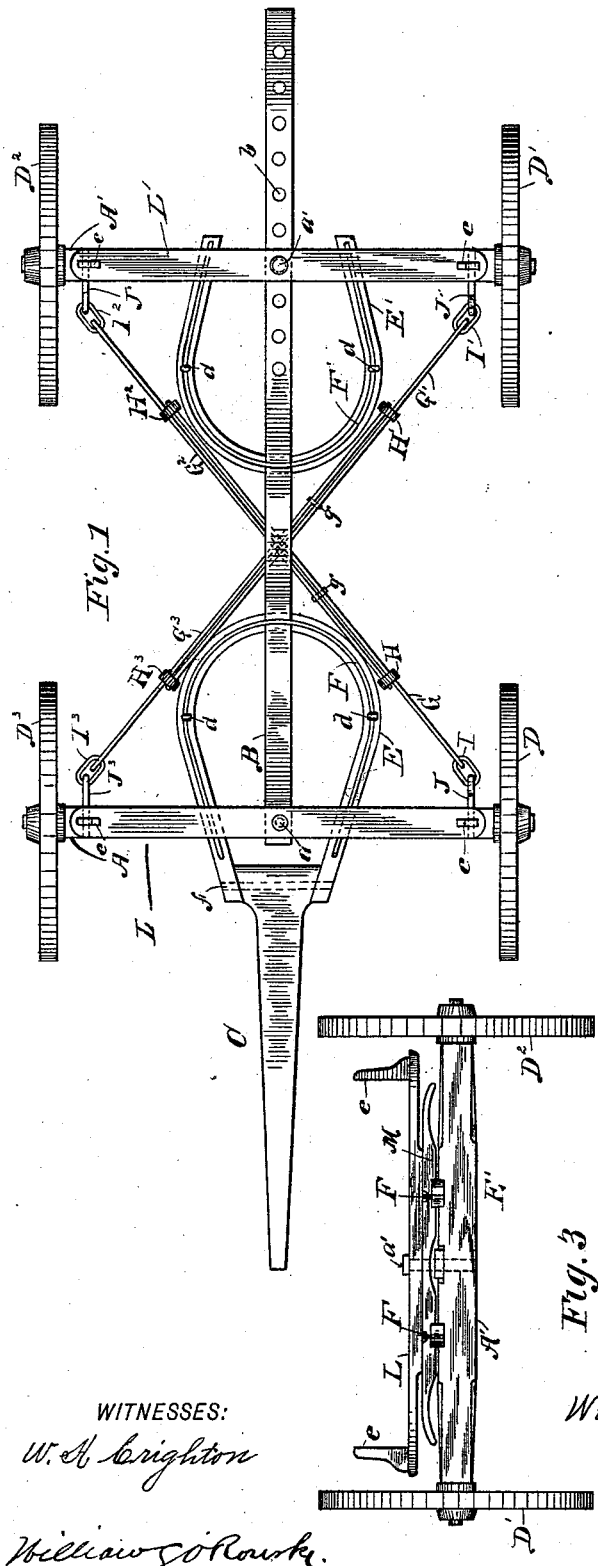
WITNESSES:
W. A. Crighton
William J. O'Rourke.
William H. Smith INVENTOR
BY Chapin & Denny
his ATTORNEYS.

UNITED STATES PATENT OFFICE.

WILLIAM H. SMITH, OF ALBION, INDIANA.

WAGON RUNNING-GEAR.

SPECIFICATION forming part of Letters Patent No. 507,563, dated October 31, 1893.

Application filed January 31, 1893. Serial No. 460,199. (No model.)

*To all whom it may concern:*

Be it known that I, WILLIAM H. SMITH, a citizen of the United States, residing at Albion, in the county of Noble, in the State of Indiana, have invented certain new and useful Improvements in Wagon Running-Gear; and I do hereby declare that the following is a full, clear, and exact description of the invention, which will enable others skilled in the art to which it appertains to make and use the same, reference being had to the accompanying drawings, which form part of this specification.

My invention relates to improvements in wagon running gear, and is specially designed and adapted for use in logging wagons, though my invention can be advantageously used in the construction of wagons designed for general farm use.

In wagons used for hauling long logs or other timbers particularly out of the woods or among numerous trees and stumps, much difficulty and inconvenience is experienced in turning or making short turns or curves, as in such cases the rear wheels unavoidably run far outside of the front wheels' tracks and thus are frequently coming in contact with standing trees, stumps or other obstacles, to the serious detriment and annoyance of the operator. The same inconvenience is experienced in the use of a wagon about the farm and for general purposes, though in a less degree, particularly in making short turns from narrow lanes into adjoining fields or from fields into farm lanes.

The object therefore of my invention is to obviate these difficulties and inconveniences by providing an improved running gear for a wagon which will permit short turning and at the same time will compel the rear wheel to follow, at all times, in the fore wheel tracks.

My invention consists in the novel construction and combination of the several parts as will be hereinafter set forth and particularly pointed out in the claims.

The objects of my invention are accomplished by the mechanism illustrated in the accompanying drawings forming part of this specification, in which similar letters indicate corresponding parts in the several views.

Figure 1 is a plan view of my invention adjusted and in position upon a wagon of well known construction. Fig. 2 is a side elevation of the same. Fig. 3 is a rear elevation of the same.

Upon the forward wagon axle A of the usual construction is properly secured the semielliptical hound E, of any suitable material between the ends of which I preferably secure the wagon tongue C in any proper manner as by a bolt $f$, and to the rear wagon-axle A' is secured in like manner the semielliptical hound E'. Properly mounted in the usual manner, upon said axles are the sand boards M and the bolsters L and L', said bolsters provided with the usual fixed stakes or standards $e$, the said sand board and bolsters being secured to said axles by the king bolts $a$ and $a'$, which king bolts also pass through the reach B, which is provided with a suitable number of perforations $b$, thus forming a pivotal connection between each of the said axles and the said reach. The semielliptical hounds E and E' are provided with the semielliptical plates or rods F and F', rigidly mounted thereon at such a height above the said hounds and parallel therewith as will permit the adjustment of the reach B between the plates F and F' and the said hounds, as seen in Figs. 1 and 2. The plates F and F' are rigidly secured to the said hounds by the staples or metallic loops $d$, and also by bending the ends thereof downward and securing the same in the body of the hounds as seen in Fig. 1. The said plates F and F' pass either through suitable slots in the upper surface of the sand boards M, or rest upon said surfaces and thus form a wearing bearing for the swinging bolsters L and L', Fig. 3.

At a suitable point on the inner surface of the axles A and A' are properly secured the hooks J, J', J$^2$, J$^3$, to which the diagonal reaches are connected. The adjustable diagonal extension reaches or draft bars G, G', G$^2$, G$^3$, preferably rectangular and metallic, are provided with a suitable number of perforations $c$ into which the pins or bolts $g$ may be inserted to secure the respective parts or reaches at any desired length of adjustment, which reaches are also held together by the metallic loops H, H', H$^2$, H$^3$, rigidly secured to the inner ends of said reaches, and in which loops the respective corresponding reach is longitudinally adjustable. The other end of each of said reaches or draft bars is provided with a suitable loop, hook or eye whereby they are connected to the hooks J, J', J², J³, respectively by means of the respective links I, I', I², and I³. When my invention thus constructed is in use, both of the said axles have a pivotal connection with the reach B, and the draft is, of course all upon the diagonal reaches or bars and not upon the reach B, the function of which, in my construction, is to keep said axles apart and prevent them from tipping out of their proper position, by means of the said semielliptical hounds and the hound-plates mounted thereon; this arrangement permits the operator to turn the wagon into any desired position in a much smaller space than is possible without the use of diagonal reaches or their equivalent, for in the operation of turning a wagon using my improvement the rear wheels will always run in the track made by the forward wheels, which is not the case in the wagons using the usual form of running gear.

The diagonal reaches may be made of any size or material found best adapted to the purpose to which my improved running gear are employed, a greater strength of the same being required in heavy logging wagons than in wagons designed for general farm use.

While I preferably mount the tongue C between the ends of the front hound E as described, I do not hereby confine myself to that form of construction as the said tongue may be otherwise mounted in any suitable manner.

Having thus described my invention, what I claim as new and useful, and desire to secure by Letters Patent, is—

In the running gear of a wagon, the combination of the diagonal reaches G, G', G², and G³ adapted for longitudinal adjustment and provided with the loops H, H', H², and H³, and the pins $g$, secured to the axles A by the hooks J, J', J², and J³; and the semielliptical hounds E and E' provided with the hound-plates F and F' and rigidly secured to the said axles with the bolsters L and L' and the pivoted reach B, all substantially as set forth and described.

Signed by me this 26th day of January, 1893.

WILLIAM H. SMITH.

Witnesses:
ELI SMITH,
HENRY G. ZIMMERMAN.